(12) United States Patent
Richter

(10) Patent No.: US 12,190,213 B2
(45) Date of Patent: Jan. 7, 2025

(54) APPARATUS AND METHOD FOR GENERATING TAILORED USER SPECIFIC ENCOURAGEMENT PROMPTS

(71) Applicant: Linda Lee Richter, Oakland, CA (US)

(72) Inventor: Linda Lee Richter, Oakland, CA (US)

( * ) Notice: Subject to any disclaimer, the term of this patent is extended or adjusted under 35 U.S.C. 154(b) by 0 days.

(21) Appl. No.: 18/112,887

(22) Filed: Feb. 22, 2023

(65) Prior Publication Data

US 2024/0281698 A1 Aug. 22, 2024

(51) Int. Cl.
*G06N 20/00* (2019.01)
*G06F 9/451* (2018.01)

(52) U.S. Cl.
CPC ............. *G06N 20/00* (2019.01); *G06F 9/451* (2018.02)

(58) Field of Classification Search
CPC ................................. G06N 20/00; G06F 9/451
See application file for complete search history.

(56) References Cited

U.S. PATENT DOCUMENTS

| | | | | |
|---|---|---|---|---|
| 5,848,396 A * | 12/1998 | Gerace | ................... | G06Q 30/02 705/7.29 |
| 6,754,470 B2 * | 6/2004 | Hendrickson | ......... | H04L 67/535 455/67.11 |
| 9,056,256 B2 * | 6/2015 | Brown | ................... | G06Q 50/01 |
| 10,158,480 B1 * | 12/2018 | Winklevoss | .......... | H04L 9/3247 |
| 10,735,205 B1 * | 8/2020 | Wentz | ................... | H04L 9/3257 |
| 10,742,421 B1 * | 8/2020 | Wentz | ................... | H04L 9/0897 |
| 10,915,891 B1 * | 2/2021 | Winklevoss | .......... | H04L 9/3255 |
| 11,017,688 B1 * | 5/2021 | Arazi | ................... | H04W 4/029 |
| 11,228,810 B1 * | 1/2022 | Arazi | ............... | H04N 21/44222 |
| 11,240,025 B2 * | 2/2022 | Wentz | ..................... | G06F 21/64 |
| 11,334,833 B2 * | 5/2022 | Friske | ............... | G06Q 30/0281 |
| 11,551,803 B1 * | 1/2023 | Arazi | ..................... | G16H 50/30 |
| 11,625,615 B2 * | 4/2023 | Neumann | ........... | G06F 16/3344 706/46 |
| 11,671,258 B1 * | 6/2023 | Willardson | ........... | H04L 9/3247 380/1 |
| 2008/0109362 A1 * | 5/2008 | Fransdonk | .......... | H04L 63/0823 705/51 |
| 2013/0268357 A1 * | 10/2013 | Heath | .................... | G06Q 10/10 726/26 |
| 2014/0004492 A1 * | 1/2014 | O'Reilly | ............ | G09B 19/0038 434/236 |
| 2014/0315170 A1 * | 10/2014 | Ionescu | .................... | G09B 5/02 434/236 |
| 2016/0357173 A1 * | 12/2016 | Foschini | ................ | G16H 50/70 |
| 2019/0027052 A1 | 1/2019 | Moore | | |
| 2020/0007331 A1 * | 1/2020 | Wentz | ..................... | H04L 9/006 |
| 2020/0234185 A1 * | 7/2020 | Rugel | .................... | G16H 50/20 |
| 2021/0004691 A1 * | 1/2021 | Neumann | .............. | G16H 50/70 |

(Continued)

*Primary Examiner* — Tadesse Hailu

(74) *Attorney, Agent, or Firm* — Caldwell Intellectual Property Law

(57) ABSTRACT

An apparatus and method for generating tailored user encouragement prompts are described. The apparatus includes at least a processor and a memory communicatively coupled to the at least a processor. The memory includes instructions configuring the at least a processor to receive user data associated with a user, compile user interaction data, determine at least one user specific propensity based on the plurality of user data, determine at least one user prompt based on the at least one user specific propensity, and output the at least one user prompt to the user.

20 Claims, 8 Drawing Sheets

(56) References Cited

U.S. PATENT DOCUMENTS

| | | | |
|---|---|---|---|
| 2021/0295180 A1* | 9/2021 | Neumann | G06N 20/00 |
| 2022/0122017 A1* | 4/2022 | Kelley | G06Q 10/06395 |
| 2022/0158855 A1* | 5/2022 | Wentz | H04L 9/3247 |
| 2022/0374739 A1* | 11/2022 | Parra | G06N 20/00 |
| 2023/0007439 A1* | 1/2023 | Williams | G06Q 10/0635 |
| 2023/0144616 A1* | 5/2023 | Taki | G06F 3/165 |
| | | | 706/12 |
| 2023/0222890 A1* | 7/2023 | Zhang | G16H 20/70 |
| | | | 340/573.1 |

* cited by examiner

APPARATUS AND METHOD FOR GENERATING TAILORED USER SPECIFIC ENCOURAGEMENT PROMPTS

FIELD OF THE INVENTION

The present invention generally relates to the field of user specific content generation on a decentralized platform. In particular, the present invention is directed to an apparatus and method for generating tailored user specific encouragement prompts.

BACKGROUND

Many people tend to have preferences for content that the user may find engaging. Such preferences are difficult for automated processes to detect and quantify, as the data that represents these preferences can be imprecise. Existing solutions are not sufficient.

SUMMARY OF THE DISCLOSURE

In an aspect, an apparatus for generating tailored user encouragement prompts is provided. The apparatus includes at least a processor and a memory communicatively coupled to the at least a processor. The memory includes instructions configuring the at least a processor to receive user data associated with a user, compile user interaction data for the user, determine at least one user specific propensity based on the plurality of user data, determine at least one user prompt based on the at least one user specific propensity, and output the at least one user prompt to the user.

In another aspect, a method for generating tailored user encouragement prompts is provided. The method includes receiving, by at least a processor, user data associated with a user, compiling, by the at least a processor, user interaction data for the user, determining, by the at least a processor, at least one user specific propensity based on the plurality of user data, determining, by the at least a processor, at least one user prompt based on the at least one user specific propensity, and outputting, by the at least a processor, the at least one user prompt to the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
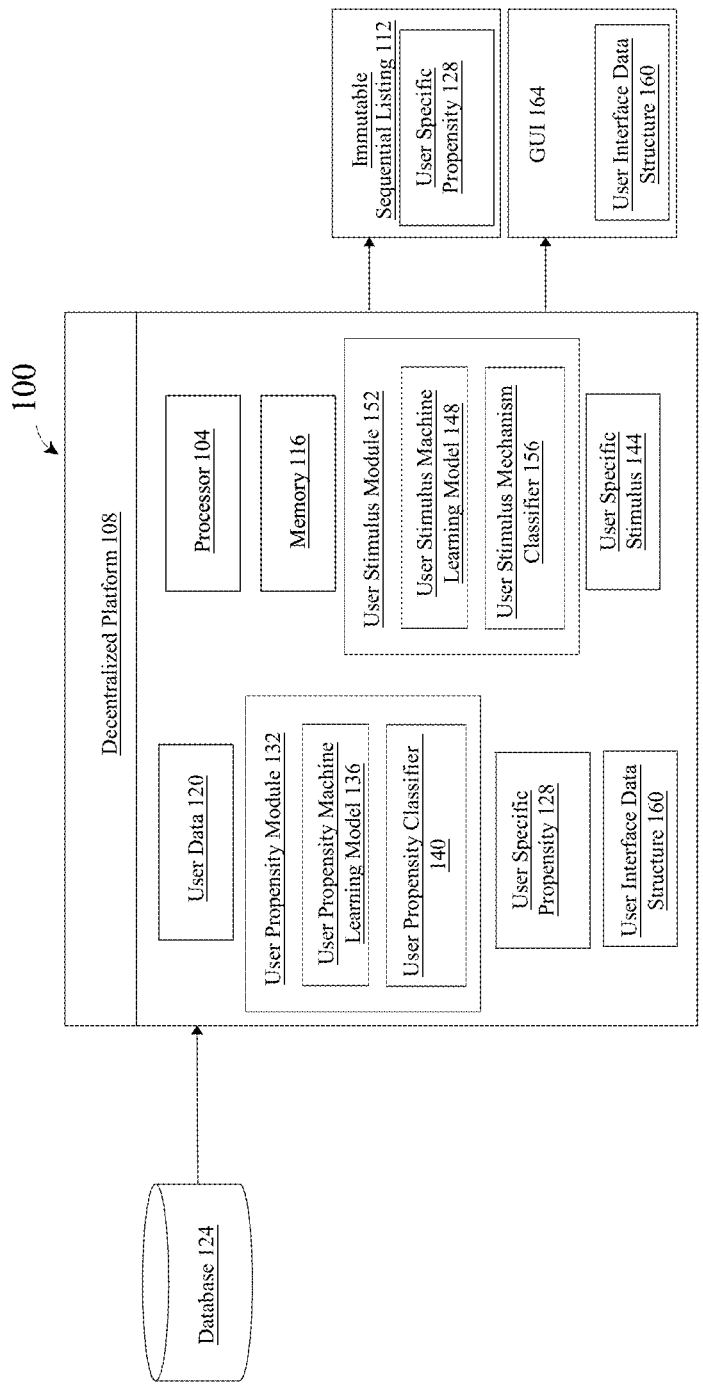
FIG. 1 is a block diagram of an exemplary embodiment of an apparatus for generating tailored user specific encouragement prompts in accordance with one or more embodiments of the present disclosure.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating tailored user specific encouragement prompts. In various embodiments, generating tailored user specific encouragement prompts may include receiving user data associated with a user. Aspects of the present disclosure may also be used to generate user prompts that are tailored and specific to the user.

Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

In some embodiments, apparatuses and methods described herein may generate, evaluate, and/or utilize digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted;

if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 for generating tailored user specific encouragement prompts is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a processor 104/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, apparatus 100 may include a decentralized platform 108 for which a processor 104 and/or apparatus 100 may operate on. A "decentralized platform," as used in this disclosure, is a platform or server that enables secure data exchange between anonymous parties. Decentralized platform 108 may be supported by any blockchain technologies. For example, and without limitation, blockchain-supported technologies can potentially facilitate decentralized coordination and alignment of human incentives on a scale that only top-down, command-and-control structures previously could. "Decentralization," as used in this disclosure, is the process of dispersing functions and power away from a central location or authority. In a non-limiting embodiment, decentralized platform 108 can make it difficult if not impossible to discern a particular center. In some embodiments, decentralized platform 108 can include a decentralized ecosystem. Decentralized platform 108 may serve as an ecosystem for decentralized architectures such as an immutable sequential listing and/or blockchain.

In a non-limiting embodiment, and still referring to FIG. 1, decentralized platform 108 may implement decentralized finance (DeFi). "Decentralized finance," as used in this disclosure, is financial technology based on secure distributed ledgers. A decentralized finance architecture may include cryptocurrencies, software, and hardware that enables the development of applications. DeFi offers financial instruments without relying on intermediaries such as brokerages, exchanges, or banks. Instead, it uses digitally signed assertions on a blockchain. DeFi platforms allow people to lend or borrow funds from others, speculate on price movements on assets using derivatives, trade cryptocurrencies, insure against risks, and earn interest in savings-like accounts. In some embodiments, DeFi uses a layered architecture and highly composable building blocks. In some embodiments DeFi platforms may allow creators and/or owners to lend or borrow funds from others, trade cryptocurrencies and/or NFTs, insure against risks, and receive payments. In a non-limiting embodiment, Defi may eliminate intermediaries by allowing creators to conduct financial transactions through peer-to-peer financial networks that use security protocols, connectivity, software, and hardware advancements. Persons skilled in the art, upon reviewing the entirety of this disclosure, will be aware of the various embodiments of implementing decentralized finance for purposes as described herein. A "non-fungible token" (NFT), as used in this disclosure, is a cryptographic asset on an immutable sequential listing with unique identification codes and metadata that distinguishes it from other NFTs. Further, association with an NFT may include incorporation in the NFT and/or in a record, such as an immutable sequential listing posting, referring to and/or creating the NFT, of one or more elements of data associated with and/or linked to the data associated with and/or represented by the NFT. For instance, NFT may contain and/or be linked to a representation of data associated with and/or represented by the NFT, where the representation may include a uniform resource locator (URL) or other uniform resource identifier (URI) indicating the data and/or a location where the data may be found and/or viewed, a cryptographic hash of the data, a secure proof of the data and/or proof of knowledge of the data and/or a digital signature created using such proofs and/or the data and/or generated by a person or device associated therewith using, for instance an immutable sequential listing posting or the like, an identifier such as a universally unique identifier (UUID), a globally unique identifier (GUID), an identifier assigned within a system, platform and/or immutable sequential listing, a database record or other memory location of data, and/or any combination of the above.

In a non-limiting embodiment, and still referring to FIG. 1, decentralized platform 108 may implement Web 3.0. Whereas Web 2.0 is a two-sided client-server architecture, with a business hosting an application and users (customers and advertisers), "Web 3.0," as used in this disclosure, is an idea or concept that decentralizes the architecture of data storage on open platforms. In some embodiments, decentralized platform 104 may enable communication between a plurality of computing devices, wherein it is built on a back end of a peer-to-peer and decentralized network of nodes (computing devices), the applications run on decentralized storage systems rather than centralized servers. In some embodiments, these nodes of computing devices may be combined together to form a World Computer. A "World Computer," as used in this disclosure, is a group of computing devices that are capable of automatically executing digitally signed assertion programs on a decentralized network. A "decentralized network," as used in this disclosure, is a set of computing device sharing resources in which the architecture of the decentralized network distributes workloads among the computing devices instead of relying on a single central server. In a non-limiting embodiment, a decentralized network may include an open, peer-to-peer, Turing-complete, and/or global system. A World Computer and/or apparatus 100 may be communicatively connected to immutable sequential listing 112. Any digitally signed assertions onto immutable sequential listing 112 may be configured to be confirmed by the World Computer. Alternatively, or additionally, apparatus 100 may be configured to store a copy of immutable sequential listing 112 into memory 116. This is so, at least in part, to process a digitally signed assertion that has a better chance of being confirmed by the World Computer prior to actual confirmation. In a non-limiting embodiment, decentralized platform 108 may be configured to tolerate localized shutdowns or attacks; it is censorship-resistant. In another non-limiting embodiment decentralized platform 108 and/or apparatus 100 may incorporate trusted computing. In a non-limiting example, because there is no one from whom permission is required to join the peer-to-peer network, as long as one operates according to the protocol; it is open-source, so its maintenance and integrity are shared across a network of engineers; and it is distributed, so there is no central server nor administrator from whom a large amount of value or information might be stolen. Persons skilled in the art, upon reviewing the entirety of this disclosure, will be aware of the various embodiments and functions of a decentralized platform for purposes as described herein.

With continued reference to FIG. 1, decentralized platform 108 may include a decentralized exchange platform. A "decentralized exchange platform," as is used in this disclosure, contains digital technology, which allows buyers and sellers of securities such as NFTs to deal directly with each other instead of meeting in a traditional exchange. In some embodiments, decentralized platform 108 may include an NFT marketplace. An "NFT marketplace" is a marketplace allowing users to trade NFTs and upload them to an address. Decentralized platform 108 may act as any NFT marketplace such as, but not limited to, OpenSea, Polygon, FCTONE, The Sandbox, CryptoKitties, Dentraland, Nifty Gateway, VEEFreinds, ROCKI, SuperRare, Enjin Marketplace, Rarible, WazirX, Portion, Zora, Mintable, PlayDapp, Aavegotchi, and the like thereof. Persons skilled in the art, upon reviewing the entirety of this disclosure, will be aware of the various embodiments of a marketplace in the context of NFTs.

With continued reference to FIG. 1, a computing device and/or apparatus 100 may include a memory 116 and at least a processor 104. Memory 116 may include any memory as described in this disclosure. Memory 116 may be communicatively connected to processor 104. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Memory 116 may be configured to provide instructions to processor 104, which may include any processor as described in this disclosure.

Still referring to FIG. 1, processor 104 is configured to receive user data 120 associated with a user. As used in this disclosure, "user data" is a collection of data and/or information about a user's activity on decentralized platform 108. User data 120 may comprise a plurality of user related data. "User related data," as used in this disclosure, is information that includes details about and/or pertaining to a user. A "user," as used in this disclosure, is a person, or individual who interacts with decentralized platform 108. In an embodiment, user data and/or user related data may be obtained using a user device associated with a user. A "user device," for the purpose of this disclosure, is any additional computing device, such as a mobile device, laptop, desktop computer, or the like. In a non-limiting embodiment, user device may be a computer and/or smart phone operated by a user in a remote location. User device may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device may include a graphical user interface (GUI) configured to display any information from apparatus 100, any computing device, and/or decentralized platform 108. In some embodiments, user related data may be in various format such as, without limitation, txt file, JSON file, word document, pdf file, excel sheet, image, video, audio, and the like. Additionally, or alternatively, user related data may be present in any data structure described in this disclosure. In an exemplary embodiment and without limitation, user related data may include any personal information related to the user. In some cases, personal information may include, without limitation, user's name, age, gender, identification, profession, experience in profession, geographical information, family information, employer, and the like. Additionally, or alternatively, user related data may also include any finance information related to the user. In exemplary embodiments, finance information may include, without limitation, assets, income, expense, debts, and the like. Additionally, or alternatively, user related data may include any health information related to the user. In exemplary embodiments, health information may include, without limitation, wellness, insurance, medical records, disease records, lifestyle, and the like thereof. In a non-limiting example, processor 104 may receive a user related in a text file format, wherein the data collection may include user's personal information such as, without limitation, user's name, age, gender, home address, and the like thereof. Additionally, or alternatively, user related data may include, without limitation, user activity data, user behavior data, and the like. As used in this disclosure, "user interaction data" is data about a user's participation on decentralized platform 108. In an exemplary embodiment, user activity data may include data about past interactions a user has had with user device, decentralized platform, and the like. Further, "user behavior data," as used in this disclosure, is data about a how a user responds to outputs from the apparatus 100, user device, and decentralized platform 108.

With further reference to FIG. 1, receiving user data associated with a user may include collecting user interaction data for user interactions. For example, processor 104 may be configured to track user interactions with apparatus 100, user device, and/or decentralized platform and determine user interaction data based on the tracked user interactions. Additionally, or alternatively, receiving user data associated with a user may include collecting user behavior data. For example, processor 104 may be configured to track user reactions to outputs from the apparatus 100, user device, decentralized platform 108, and the like and determine user behavior data based on the tracked user behavior. In an embodiment, processor 104 may be configured to segment each of the user data 120 and/or the user related data into categorical data. For example, processor 104 may be configured to segment the user profile and/or the user related into user activity data, user behavior data, and the like. The user data 120, user related data, and/or categorical data from other users may be stored in database 124 that is communicatively connected to processor 104.

Still referring to FIG. 1, database 124 may be implemented, without limitation, as a relational database, a key-value retrieval database such as a NOSQL database, or any other format or structure for use as a database that a person skilled in the art would recognize as suitable upon review of the entirety of this disclosure. Database 124 may alternatively or additionally be implemented using a distributed data storage protocol and/or data structure, such as a distributed hash table or the like. Database 124 may include a plurality of data entries and/or records as described above. Data entries in a database 124 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With further reference to FIG. 1, in an exemplary embodiment, collecting user interaction data for user interactions may include compiling a plurality of user interactions with apparatus 100, user device, and/or decentralized platform 108 and determine user interaction data based on compiled user interactions. For example, processor 104 may be configured to track and compile user interactions with forms, event handlers, and/or other user controls implemented by apparatus 100, user device, and/or decentralized platform. As used in this disclosure, an "event handler" is at least one program statement that is executed in response to a user interaction. Additionally, or alternatively, user interaction data may include interactive data. As used in this disclosure, "interactive data" is data about a user's actions on decentralized platform 108, apparatus 100, and user device. For example, interactive data may include what does the user they spend more time on, what does the user replay or return to, and the like. Additionally, or alternatively, user interaction data may include historical stimulus data. As used in this disclosure, "historical stimulus data" is data about past stimuli sought out by the user. For example, a user may have sought out audio stimuli, visual stimuli, and/or the like. Additionally, or alternatively, processor 104 may be configured to receive user interaction data from a camera of user device, a sensor, and the like to capture user interactions from the user.

Still referring to FIG. 1, collecting user interaction data for user interactions may include outputting, by the processor 104, a plurality of stimulus outputs, monitoring a user response to each of the plurality of stimulus outputs, and determining the user interaction data based on the user response to each of the plurality of stimulus outputs. As used in this disclosure, "a stimulus output" is output from apparatus configured to determine a response and/or reaction from a user. For example, the stimulus output may be language, visual, audio outputs, and the like. Further, the stimulus output may be any combination of a plurality of stimulus outputs. As used in this disclosure, "language" is a textual output that is displayed to the user. Additionally, or alternatively, "visual," as used in this disclosure, is an image and/or video output that is displayed to the user. Further, as used in this disclosure, "audio" is a sound output that is output to the user. For example, processor 104 may be configured to display and/or output an audio stimulus output, a visual stimulus output, and a language stimulus output, monitor subsequent actions for each of the audio stimulus output, visual stimulus output, and language stimulus output and select at least one of the audio stimulus output, visual stimulus output, and language stimulus based on the subsequent actions. For example, subsequent actions may include user attempts to get a stimulus output of the plurality of stimulus outputs repeated, user interaction with the stimulus output, and the like.

With further reference to FIG. 1, additionally, or alternatively, collecting user interaction data for user interactions may include determining a user mood as a function of the user interaction data. As used in this disclosure, "user mood" is an element of data labeling or indicating state of mind or feeling by the user, as indicated by association of data input at the computing device with such a label and/or indication; for instance, user mood may be an element of data labeling or indicating state of mind or feeling by the user as caused by or temporally proximate to at least one stimulus output. In an embodiment, user interaction data may include video data, user response data, and the like that may indicate frustration, enjoyment, and the like with outputs from decentralized platform 108 and/or apparatus 100 and processor 104 may be configured to determine a user mood based on the user interaction data. Additionally, or alternatively, processor 104 may be configured to determine the user mood using a user mood machine learning model. User mood machine learning may be any machine learning model as described herein. Determining the user mood using a user mood machine learning model may include generating a user mood machine learning model and receiving user mood training data. In an embodiment, user mood training data may include a plurality of user interaction data that are each correlated to one of a plurality of user mood data. For example, user mood training data may be used to show user interaction data may indicate a particular user mood from certain stimulus. Additionally, or alternatively, determining the user mood using a user mood machine learning model further include training the user mood machine learning model as a function of user mood training data. Further, determining the user mood using a user mood machine learning model may also include determining the user mood using trained user mood machine learning model. For instance, and without limitation, user mood may be consistent with user response data in U.S. patent application Ser. No. 18/112,914, filed on Feb. 22, 2023, and entitled, "APPARATUS AND METHOD FOR GENERATING USER GUIDANCE ON A DECENTRALIZED PLATFORM," which is incorporated by reference herein in its entirety.

With further reference to FIG. 1, additionally, or alternatively, collecting user interaction data for user interactions may include determining a stimulus effect of at least one output stimulus. In an embodiment, determining a stimulus effect may include analyzing user behavior data after receiving a stimulus output. In an exemplary embodiment, user behavior data may include video data, user response data, user mood data and the like. Additionally, or alternatively, processor 104 may be configured to determine the stimulus effect using a stimulus effect machine learning model. Stimulus effect machine learning may be any machine learning model as described herein. Determining the stimulus effect using a stimulus effect machine learning model may include generating a stimulus effect machine learning model and receiving stimulus effect training data. In an embodiment, stimulus effect training data may include a plurality of user response data that are each correlated to one of a plurality of stimulus effect data. For example, stimulus effect training data may be used to show user response data may indicate a particular stimulus effect from certain stimuli. Additionally, or alternatively, determining the stimulus effect using a stimulus effect machine learning model further include training the stimulus effect machine learning model as a function of stimulus effect training data. Further, determining the stimulus effect using a stimulus effect machine learning model may also include determining the stimulus effect using trained stimulus effect machine learning model.

[With continued reference to FIG. 1, determining a stimulus effect of at least one output stimulus may include outputting the at least one output stimulus, receiving a subsequent user action, and determining the stimulus effect based on the subsequent user action. For example, processor 104 may be configured to output at least one output stimulus in response to the user entering a user input. Processor 104 may be configured to determine the stimulus effect based on a subsequent user action. Processor 104 may be configured to determine the subsequent user interaction based on whether a user enters a subsequent user input such as inputting additional information, selecting an input, and the like. In a further exemplary embodiment, processor 104 may be configured to output at least one output stimulus in response to the user after a user completes a training module. Processor 104 may be configured to determine the stimulus effect based on a subsequent user action to the at least one output stimulus. In one embodiment, processor 104 may be configured to determine a positive stimulus effect from the user initiating a second training module. Additionally, or alternatively, processor 104 may configured to determine a negative stimulus effect from a lack of subsequent user input after the at least one output stimulus. In yet a further exemplary embodiment, processor 104 may be configured to output a user prompt to the user. User prompt may be configured to receive a user input from user to select between a plurality of user selections. Processor 104 may be configured to output at least one output stimulus based on the user input. Further, processor 104 may be configured to determine a positive stimulus effect from the user based on the user selecting a similar user selection from subsequent user prompts. Additionally, or alternatively, processor 104 may be configured to determine a negative stimulus effect from the user based on the user selecting a different user selection from subsequent user prompts. In an embodiment, processor 104 may be configured to determine the stimulus effect, as described above, using the stimulus effect machine learning model. Stimulus effect machine learning model may be trained by training data such as stimulus effect training data. In an embodiment, user stimulus training data may include a plurality of user response data that are each correlated to one of a plurality of user stimulus effect data. Stimulus effect training data may be stored in database 124.

Continuing to refer to FIG. 1, in an embodiment, user data 120, user related data, and/or user interaction data may be generated based on a smart assessment presented to the user. In an exemplary embodiment, the smart assessment may be presented to the user on a user device associated with the user. As used in this disclosure, a "smart assessment" is a set of questions and/or prompts that ask for information relating to users, wherein each question and/or prompts induce answers that affect user authentication, verification, and any processing step described in this disclosure. In some exemplary embodiments, user inputs to questions and/or prompts within smart assessment may include selecting a selection from plurality of selections as an answer. Additionally, or alternatively, user inputs to questions and/or prompts within smart assessment may include a free user input as answer. In a non-limiting exemplary embodiment, smart assessment may include a question asking the user regarding to percentage of intellectual property (IP) ownership; for instance, the question may be "Does user/entity have sole ownership in their intellectual property?" In some cases, smart assessment may be a survey, transactional tracking, an interview, a report, events monitoring, and the like. For instance, and without limitation, smart assessment may be consistent with smart assessment in U.S. patent application Ser. No. 17/984,912, filed on Nov. 10, 2022, and entitled, "APPARATUS AND METHOD FOR VETTING USER USING A COMPUTING DEVICE," which is incorporated by reference herein in its entirety.

Figure 2:
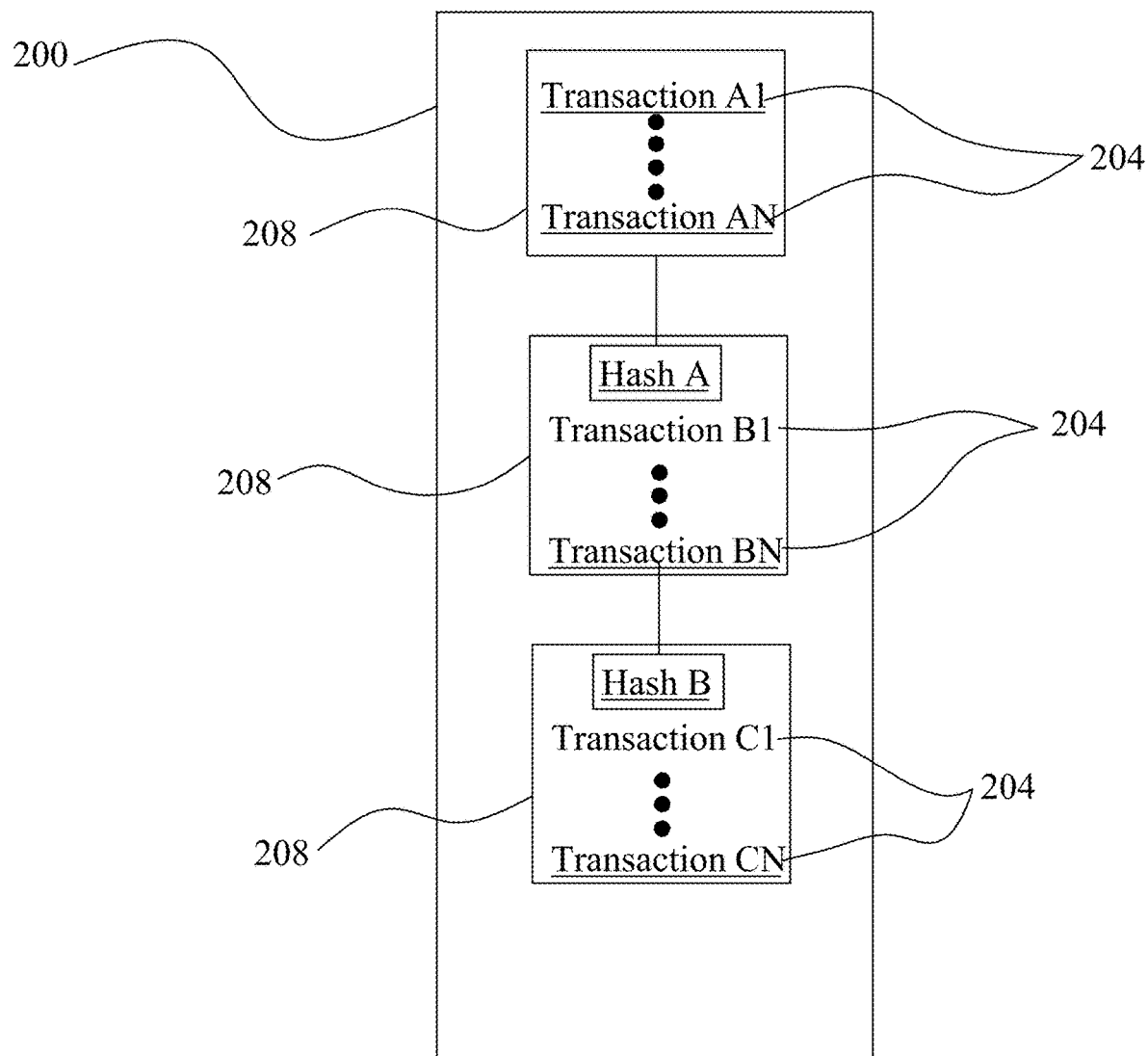
FIG. 2 is a block diagram of exemplary embodiment of an immutable sequential listing in accordance with one or more embodiments of the present disclosure.

Still referring to FIG. 1, processor 104 may be configured to store the user data 120 and/or user related data on an immutable sequential listing 112, such as immutable sequential listing 200 as described in more detail in FIG. 2. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. For example, the user profile may be configured into at least one block of data to be stored on the immutable sequential listing 112. As described herein, an immutable sequential listing 112 may include and/or implement an immutable ledger, where data entries that have been posted to immutable sequential listing 112 cannot be altered. Data elements are listings in immutable sequential listing 112; data elements may include any form of data, including user profile, textual data, image data, encrypted data, cryptographically hashed data, and the like.

With further reference to FIG. 1, processor 104 is configured to determine at least one user specific propensity 128 based on the user data. Additionally, or alternatively, processor 104 may be configured to determine the at least one user specific propensity 128 based on user interaction data, user mood, stimulus effect, and the like. As used in this disclosure, "user specific propensity" is a preference or inclination to certain outputs specific to a user that may induce a user response. "User response," as used in this disclosure, is a user input and/or reply in response to an output and/or stimulus from the apparatus 100. For example, user specific propensity 128 may include a preference for praise, words of encouragement, stimulating and/or pleasant images and/or sounds, and the like by the user. Additionally, processor 104 may be configured to use the user data 120 and/or user related data to determine the at least one user specific propensity 128. Additionally, or alternatively, processor 104 may be configured to determine a plurality of user specific propensities based on the user data. For example, user data and/or user related data may indicate that user has preferences to multiple types of stimuli and processor may be configured to determine each of the multiple types of stimuli as a plurality of user specific propensities. In a further exemplary embodiment, processor 104 may use user interaction data and/or user behavior data to determine which types of stimuli prompted a user response from the user and which types of stimuli did not prompt a user response from the user. Further, processor 104 may be configured to detect a pattern for which types of stimuli prompted a user response from the user and which types of stimuli did not prompt a user response from the user. Processor 104 may be configured to determine the plurality of user specific propensities based on the pattern for which types of stimuli prompted a user response from the user and/or which types of stimuli did not prompt a user response from the user. Alternatively, or additionally, a fuzzy inferencing system for determination of a plurality of user propensities may be employed, where any or all user propensities may be represented as values and/or fuzzy sets for linguistic variables measuring the same, as described in more detail in FIG. 6. An inferencing system may use one or more fuzzy inferencing rules, as described below in FIG. 6, to output one or more linguistic variable values and/or defuzzified values indicating a plurality of user propensities. For instance, and without limitation, user specific propensity may be consistent with user engagement preference in U.S. patent application Ser. No. 18/112,914, filed on Feb. 22, 2023, and entitled, "APPARATUS AND METHOD FOR GENERATING USER GUIDANCE ON A DECENTRALIZED PLATFORM," which is incorporated by reference herein in its entirety.

Continuing to reference FIG. 1, processor 104 may use a machine learning module, such as user propensity module 132, to implement one or more algorithms or generate one or more machine-learning models, such as user propensity machine learning model 136, to determine at least one user propensity. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data May include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. User propensity module 132 may be used to generate user propensity machine learning model 136 and/or any other machine learning model using training data. User propensity machine learning model 136 may be trained by correlated inputs and outputs of training data. Training data may be data sets that have already been converted from raw data whether manually, by machine, or any other method. Training data may include previous outputs such that user propensity machine learning model 136 iteratively produces outputs. User propensity machine learning model 136 using a machine-learning process may output converted data based on input of training data. In an embodiment, determining at least one user specific propensity based on the user data may include determining the at least one user specific propensity based on the user data using a machine learning model, such as user propensity machine learning model 136 generated by user propensity module 132. User propensity machine learning model 136 may be trained by training data, discussed in further detail below, such as user propensity training data. User propensity training data may be stored in database 124.

With continued reference to FIG. 1, determining at least one user specific propensity based on the user data may include generating a user propensity machine learning model 136 and receiving user propensity training data. In an embodiment, user propensity training data may include a plurality of user data 120 that are each correlated to one of a plurality of user propensity data. For example, user propensity training data may be used to show user data and/or user related data may indicate a particular user propensity for certain stimulus. In an exemplary embodiment, a user propensity may be a preference for visual stimulus, audio stimulus, and the like. In a further embodiment, user propensity training data may also include a plurality of user related data that are each correlated to one of a plurality of user propensity data. In such an embodiment, user propensity training data may be used to show how user related data may indicate a particular user propensity relating to certain stimuluses. Additionally, or alternatively, determining at least one user specific propensity based on the user data may further include training the user propensity machine learning model 136 as a function of user propensity training data. Further, determining at least one user specific propensity based on the user data may also include determining at least one user propensity using trained user propensity machine learning model 136.

Continuing to refer to FIG. 1, additionally, or alternatively, the determining at least one user propensity based on the user data may comprise generating, by the at least a processor 104, a user propensity classifier 140. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data, such as user propensity training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Continuing to refer to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$ where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. User propensity classifier 140 may classify user data 120 and/or user related data to one or more types and/or category of user propensity, which may include any type of user propensity, sub-categories and/or more specific categories, or the like. For instance, user propensity classifier may receive user data 120 and/or user related data and may classify the user profile and/or user related data to at least one user propensity. User propensity classifier may be trained using training data correlating user profile and/or user related data to category of user propensity. In an exemplary embodiment, categories of user propensity may include textual propensity, video propensity, image propensity, and the like. Additionally, or alternatively, the determining at least one user specific propensity may comprise classifying, by the at least a processor, the user data to at least one user specific propensity using the user propensity classifier and outputting, by the at least a processor, the at least one user specific propensity for the user.

Still referencing FIG. 1, additionally, or alternatively, determining at least one user specific propensity based on the user data may include identifying, by at least a processor 104, a user cohort for the user from a plurality of community users. As used in this disclosure, a "user cohort" is a community user with similar user specific propensities, user data, and/or user related data to the user. "Community user," as used in this disclosure, is a third-party user of decentralized platform 108. Additionally, or alternatively, determining at least one user specific propensity based on the user data may include identifying a cohort propensity based on the user cohort and determining the at least one user specific propensity based on the cohort propensity. For example, processor 104 may be configured to determine a cohort propensity for the user cohort based on user cohort data associated with the user cohort and use the cohort propensity to determine at least one user specific propensity. In an embodiment, identifying a user cohort from a plurality of community users for the user may include identifying the user cohort using a machine learning model.

With continued reference to FIG. 1, identifying the user cohort using a machine learning model may include receiving user cohort training data. In an embodiment, user cohort training data may include a plurality of user data that are each correlated to one of a plurality of community user data. For example, user cohort training data may be used to show community users that may be similar to user. In an exemplary embodiment, user cohort data may identify community users with similar behaviors, preferences, and the like to user. In a further embodiment, user cohort training data may also include a plurality of user data that are each correlated to one of a plurality of community user data. In such an embodiment, user cohort training data may be used to identify a community user with similar preferences, behaviors, and the like. Further, identifying the user cohort using a machine learning model may further include training a user cohort machine learning model as a function of user cohort training data. Further, identifying the user cohort using a machine learning model may also include identifying the user cohort using trained user cohort machine learning model. One skilled in the art will recognize the various ways processor 104 may be configured to identify a user cohort.

Still referring to FIG. 1, processor 104 may be configured to store at least one user propensity 128 on an immutable sequential listing 112, such as immutable sequential listing 200 as described in more detail in FIG. 2. For example, at least one user propensity may be configured into at least one block of data to be stored on the immutable sequential listing 112. As described herein, an immutable sequential listing 112 may include and/or implement an immutable ledger, where data entries that have been posted to immutable sequential listing 112 cannot be altered. Data elements are listings in immutable sequential listing 112; data elements may include any form of data, including textual data, image data, encrypted data, cryptographically hashed data, and the like.

With further reference to FIG. 1, processor 104 is configured to generate at least one user stimulus 144 based on at least one user specific propensity 128. As used in this disclosure, a "user stimulus" is an output from apparatus configured to induce a response and/or reaction from a user. In an exemplary embodiment, at least one user stimulus 144 may be configured to encourage compliance, accurate participation, continued participation, and the like by user. At least one user stimulus 144 may be generated based on user data, user related data, user interaction data, and the like. Additionally, or alternatively, in an embodiment, processor 104 may be configured to determine a plurality of user specific propensities 128 and modify the at least one user stimulus 144 based on the plurality of user specific propensities 128 when processor. For example, when processor 104 determines a user may have a plurality of user specific propensities, processor 104 may be configured to generate at least one user stimulus 144 based on one of the plurality of user specific propensities 128 and modify the at least one user stimulus 144 based on the remaining plurality of user specific propensities to ensure the at least one user stimulus accounts for each of the plurality of user specific propensities.

With continued reference to FIG. 1, the processor 104 may be configured to generate at least one user stimulus based on the at least one user specific propensity using a machine learning model, such as user stimulus machine learning model 148 generated by user stimulus module 152. User stimulus machine learning model 148 may be trained by training data, discussed in further detail below, such as user stimulus training data. User stimulus training data may be stored in a database such as database 124.

With continued reference to FIG. 1, generating at least one user stimulus based on the at least one user specific propensity using a machine learning model may include generating a user stimulus machine learning model 148 and receiving user stimulus training data. In an embodiment, user stimulus training data may include a plurality of user profile 120 data that are each correlated to one of a plurality of user stimulus data. For example, user stimulus training data may be used to show user data may indicate a particular preference for user stimulus. In an exemplary embodiment, a user stimulus may be praise, words of encouragement, stimulating and/or pleasant images and/or sounds, or the like. In a further embodiment, user stimulus training data may also include a plurality of user related data and/or user specific propensity 128 data that are each correlated to one of a plurality of user stimulus data. In such an embodiment, user stimulus training data may be used show how user related data and/or user specific propensity 128 data may indicate a particular user stimulus. In a further embodiment, user stimulus training data may also include a plurality of user specific propensity 128 data that are each correlated to one of a plurality of user stimulus 144 data. In such an embodiment, user stimulus training data may be used to show how user specific propensity 128 data may indicate a preference for a particular user stimulus. Generating at least one user stimulus based on the at least one user specific propensity using a machine learning model may further include training the user stimulus machine learning model 148 as a function of user stimulus training data. Further, generating at least one user stimulus based on the at least one user specific propensity may also include determining at least one user stimulus using trained user stimulus machine learning model 148.

Still referring to FIG. 1, determining at least one user stimulus based on the at least one user specific propensity may include determining a user stimulus mechanism for the at least one user stimulus. As used in this disclosure, a "user stimulus mechanism" is a category of output for the user stimulus. For example, the user stimulus mechanism may be language, visual, audio outputs, and the like. Further, the user stimulus mechanism may be any combination of a plurality of user stimulus mechanisms. As used in this disclosure, "language" is a textual output that is displayed to the user. Additionally, or alternatively, "visual," as used in this disclosure, is an image and/or video output that is displayed to the user. Further, as used in this disclosure, "audio" is a sound output that is output to the user. In a further non-limiting embodiment, the user stimulus mechanism may also be praise, words of encouragement, stimulating and/or pleasant images and/or sounds, and the like. Additionally, or alternatively, processor 104 may be configured to determine a user stimulus mechanism for the at least one user stimulus using a machine learning model, such as stimulus mechanism machine learning model.

With continued reference to FIG. 1, determining a user stimulus mechanism for the at least one user stimulus using a machine learning model may include receiving user stimulus mechanism training data. In an embodiment, user stimulus mechanism training data may include a plurality of user data and/or user related data that are each correlated to one of a plurality of user stimulus mechanism data. As used in this disclosure, "user stimulus mechanism data" is data related to a method of delivery of user stimulus to users. For example, user stimulus mechanism training data may be used to show certain methods of delivery of user stimulus are preferred by users. In an exemplary embodiment, a user stimulus mechanism may be audio, visual, and the like. In a further embodiment, user stimulus mechanism training data may also include a plurality of user propensity data that are each correlated to one of a plurality of user stimulus mechanism data. In such an embodiment, user stimulus mechanism training data may be used show how user propensity data may indicate user stimulus mechanisms that are preferred by different users. Determining a user stimulus mechanism for at least one user stimulus using a machine learning model may further include training the user stimulus mechanism machine learning model as a function user stimulus mechanism training data. Further, determining a user stimulus mechanism for at least one user stimulus using a machine learning model may also include generating the user stimulus mechanism as a function of the trained user stimulus mechanism machine learning model.

With further reference to FIG. 1, additionally, or alternatively, determining a user stimulus mechanism for the at least one user stimulus may comprise generating, by the at least a processor 104, a user stimulus mechanism classifier 156. As described above, a "classifier," is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. User stimulus mechanism classifier 156 may classify user profile and/or user related data to one or more types and/or category of user stimulus mechanism, which may include any type of user stimulus mechanism, sub-categories and/or more specific categories, or the like. For instance, user stimulus mechanism classifier 156 may receive user profile and/or user related data and may classify the user profile and/or user related data to at least one user propensity. Additionally, or alternatively, user stimulus mechanism classifier 156 may receive the at least one user specific propensity and may classify the at least one user specific propensity to at least one user stimulus mechanism. User stimulus mechanism classifier may be trained using training data correlating user profile, user related data, and/or user specific propensity data to category of user stimulus mechanism. Additionally, or alternatively, determining a user stimulus mechanism for the at least one user stimulus may comprise classifying, by the at least a processor, the user data, user related data, and/or the at least one user specific propensity to at least one user stimulus mechanism using the user stimulus mechanism classifier and outputting, by the at least a processor, the at least one user stimulus mechanism for the user.

With further reference to FIG. 1, determining at least one user stimulus based on the at least one user specific propensity may include determining a user response to the at least one user stimulus. As used in this disclosure, "user response" is a reaction and/or response from the user to at least one user stimulus. Additionally, or alternatively, processor 104 may be configured to determine the user response based on user interaction data, user behavior data, and the like. For example, processor 104 may be configured to predict a user response to the at least one user stimulus based on data about past user interactions with apparatus 100, user device, and/or decentralized and/or data bout user responses to outputs from the apparatus 100, user device, decentralized platform 108, and the like.

With continued reference to FIG. 1, processor 104 is configured to output the at least one user stimulus to the user. For example, processor 104 may be configured to display at least one user stimulus on the user device, play an audio output of praise, words of encouragement, and/or pleasant sounds using the user device. Additionally, or alternatively, processor 104 may be configured to generate a user interface data structure 160 configured to display at least one user stimulus. The user interface data structure 160 may allow at least one user stimulus to be displayed on a display, graphical user interface, and the like. At least one user stimulus may be displayed, output, and the like to the user to encourage compliance, accurate participation, continued participation with decentralized platform 108 by the user.

Continuing to refer to FIG. 1, processor 104 is connected to a graphical user interface (GUI) 164 configured to display any information from apparatus 100 and/or any computing device. As used in the current disclosure, a "graphical user interface" may include a plurality of lines, images, symbols. GUI 164 may be displayed on a display device. Display device may include, but is not limited to, a smartphone, tablet, laptop, monitor, tablet, and the like. Display device may include a separate device that includes a transparent screen configured to display computer generated images and/or information. The user may view the information displayed on the display device in real time. GUI 164 may be configured to receive user input. A "user input" as used in this disclosure is information received from an individual. User input may include, for instance and without limitation, information entered via text fields, information entered via clicking on icons of a graphical user interface (GUI), information entered via touch input received through one or more touch screens, and the like.

With further reference to FIG. 1, GUI 164 may be configured to receive the user interface data structure for the at least one user stimulus. Additionally, or alternatively, the GUI 164 may be configured to display the at least one user stimulus as a function of the user interface data structure for review by a user to encourage and reward encourage compliance, accurate participation, continued participation with decentralized platform 108.

Referring now to FIG. 2, an exemplary embodiment of an immutable sequential listing is illustrated 200. An immutable sequential listing 200 may be, include and/or implement an immutable ledger, where data entries that have been posted to immutable sequential listing 200 cannot be altered. Data elements are listings in immutable sequential listing 200; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as crypto currency, as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g., a ride share vehicle or any other asset. Digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. Digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2, immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. Immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208. Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in immutable sequential listing 200.

Still referring to FIG. 2, additional data linked to at least a posted content may be incorporated in sub-listings 208 in immutable sequential listing 200; for instance, data may be incorporated in one or more fields recognized by block chain protocols that permit a person or computer forming a at least a posted content to insert additional data in immutable sequential listing 200. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto currency. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a posted content as described above.

Figure 3:
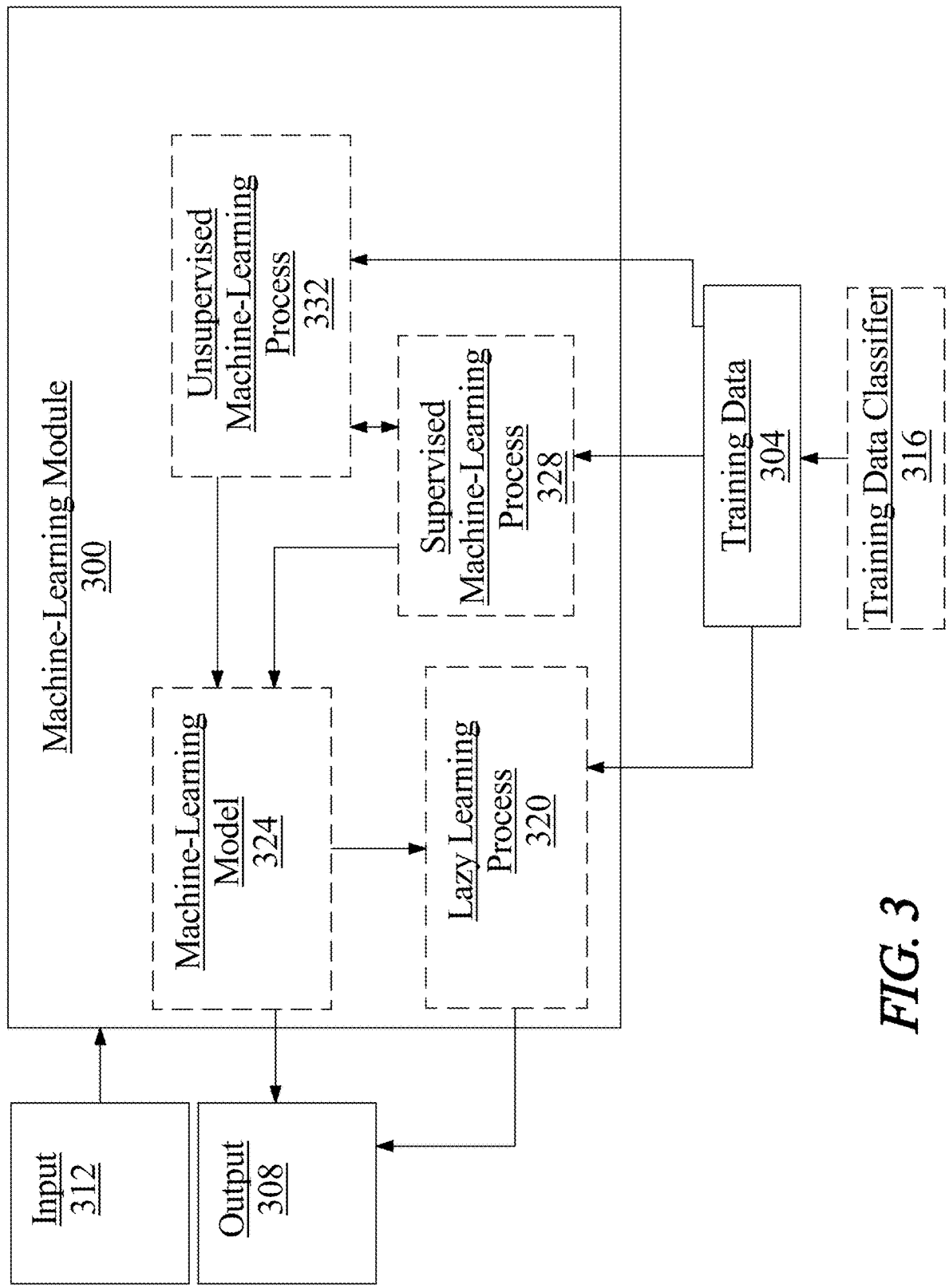
FIG. 3 is a block diagram of an exemplary embodiment of a machine learning module in accordance with one or more embodiments of the present disclosure.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network including an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
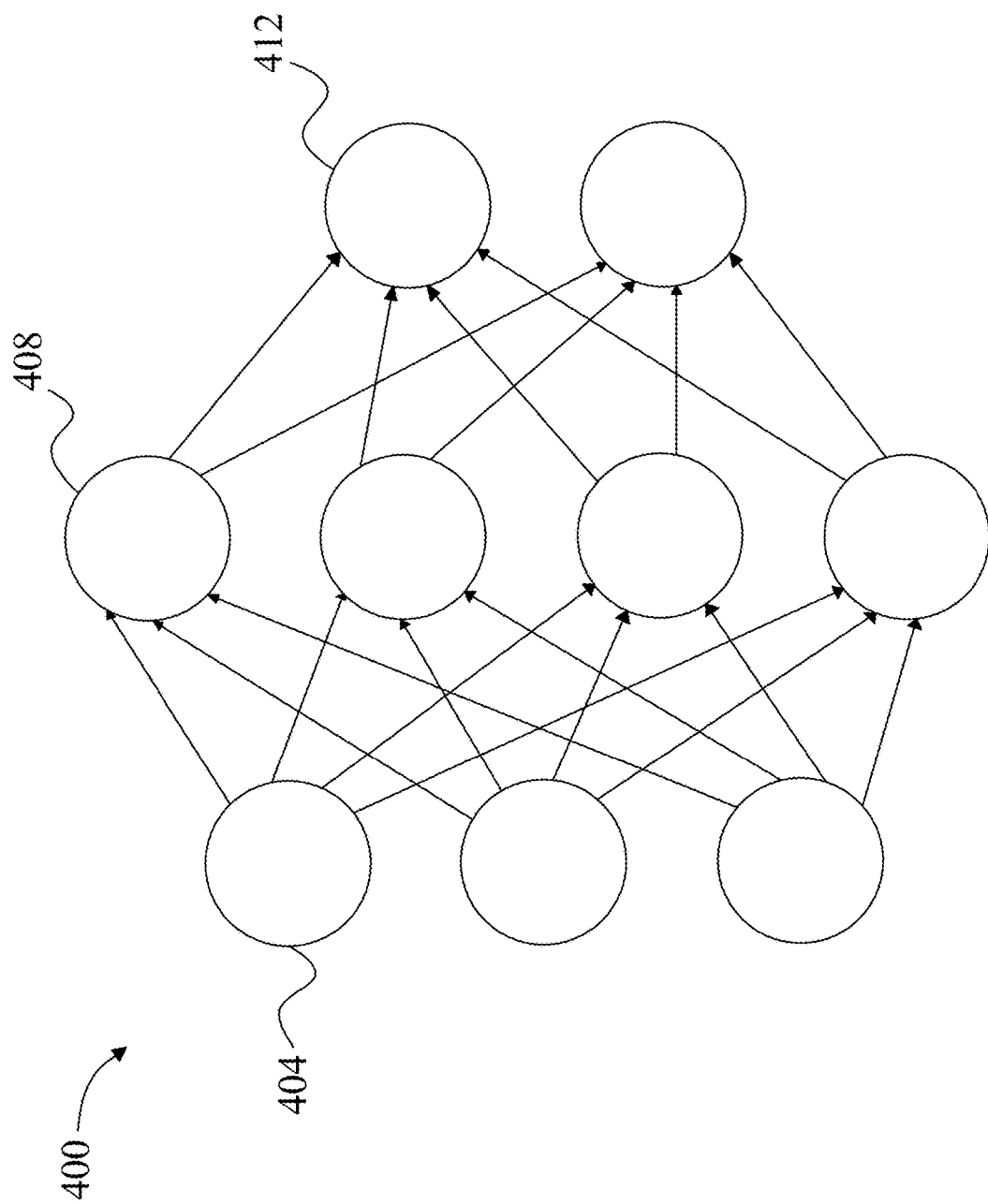
FIG. 4 is a diagram of an exemplary nodal network in accordance with one or more embodiments of the present disclosure.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
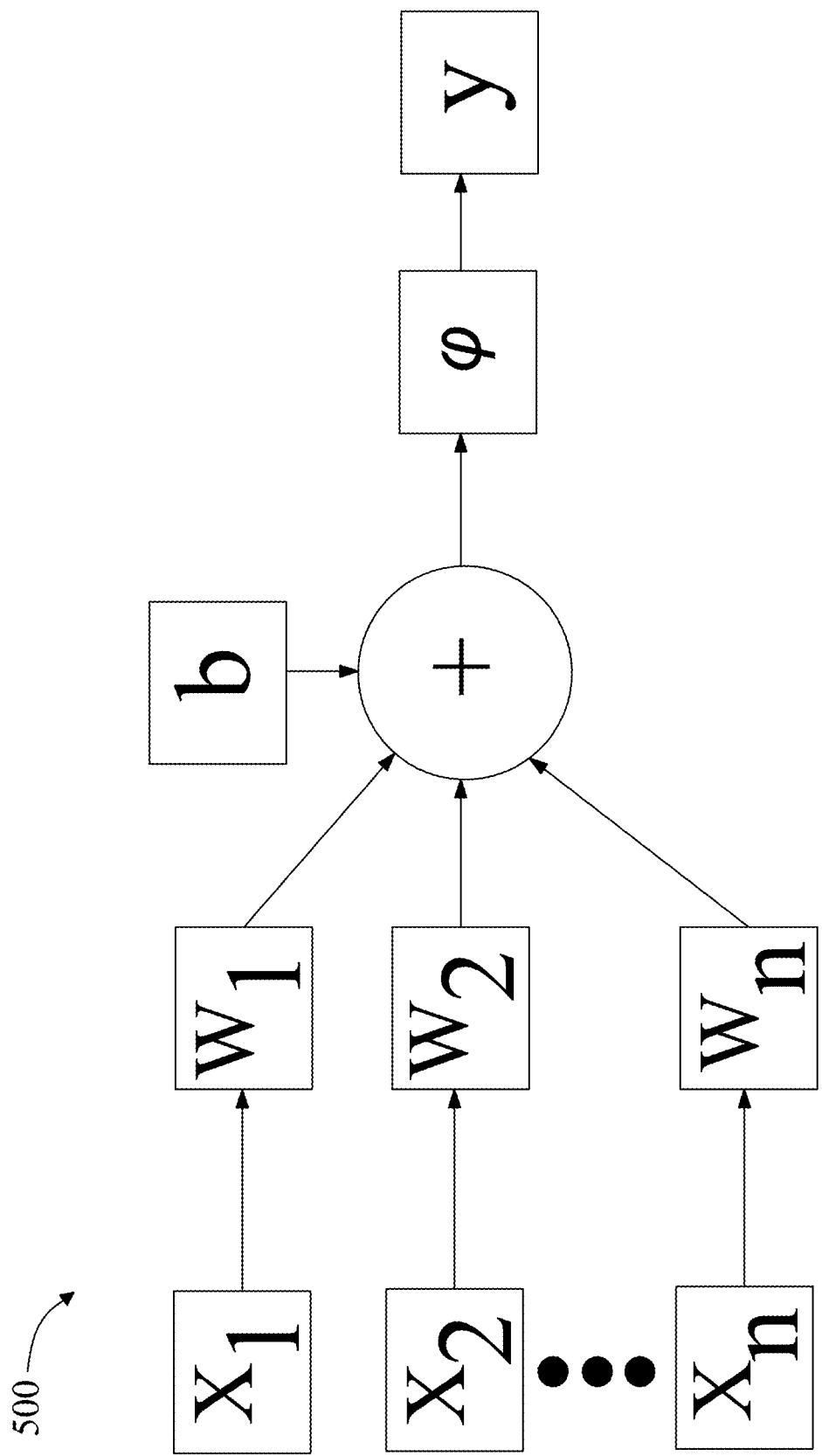
FIG. 5 is a block diagram of an exemplary node in accordance with one or more embodiments of the present disclosure.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
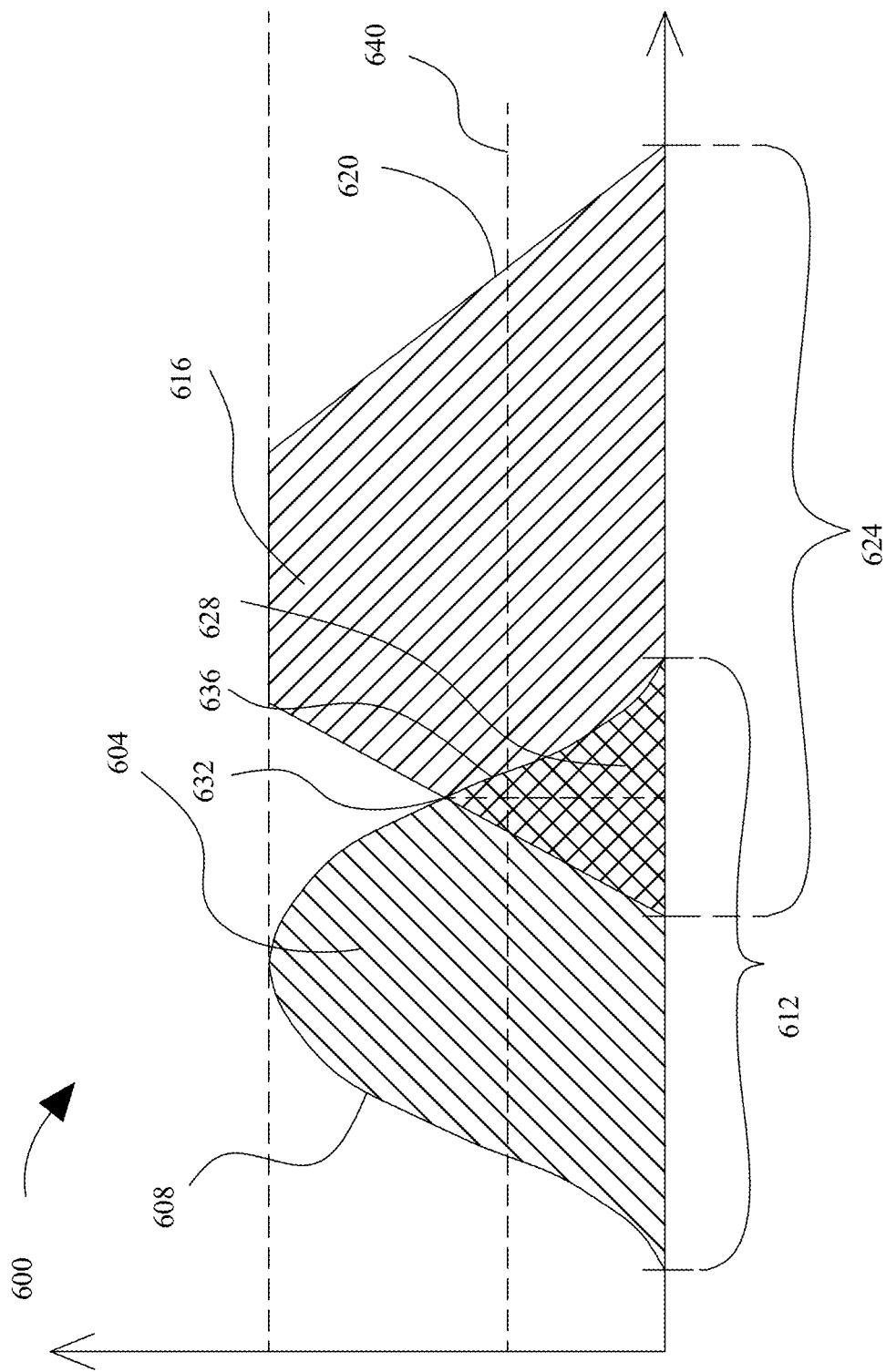
FIG. 6 is a schematic diagram illustrating an exemplary embodiment of a fuzzy inferencing system.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 662 representing a probability, as defined on probability interval, of a match between first fuzzy set 604 and second fuzzy set 616. Alternatively, or additionally, a single value of first and/or second fuzzy set may be located at a locus 666 on first range 612 and/or second range 624, where a probability of membership may be taken by evaluation of first membership function 608 and/or second membership function 620 at that range point. A probability at 628 and/or 662 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models, for combination to occur as described above. Alternatively, or additionally, each threshold may be tuned by a machine-learning and/or statistical process, for instance and without limitation as described in further detail below.

Further referring to FIG. 6, in an embodiment, a degree of match between fuzzy sets may be used to classify the user data with at least one corresponding user specific propensity. For example, if user related data has a fuzzy set matching a first user specific propensity fuzzy set by having a degree of overlap exceeding a threshold, processor 104 may determine user specific propensity as one of the at least one user specific propensity. Where multiple fuzzy matches are performed, degrees of match for each respective fuzzy set may be computed and aggregated through, for instance, addition, averaging, or the like, to determine an overall degree of match.

Still referring to FIG. 6, in an embodiment, user data may be compared to multiple user specific propensity fuzzy sets. For instance, user data, as described above, may be represented by a fuzzy set that is compared to each of the multiple user specific propensity fuzzy sets; and a degree of overlap exceeding a threshold between the user data fuzzy set and any of the multiple user specific propensity fuzzy sets may cause processor 104 to identify each of the user specific propensities as recommended a user specific propensity of the at least one user specific propensity. For instance, in one embodiment there may be user specific propensity fuzzy sets, representing respectively a first user specific propensity and a second user specific propensity. A first user specific propensity may have a first fuzzy set; second user specific propensity may have a second fuzzy set; and user data may have a user data fuzzy set. Processor 104, for example, may compare a user data fuzzy set with each of first user specific propensity fuzzy set and second user specific propensity fuzzy set, as described above, and identify either, both, or neither of first and second user specific propensity as at least one user specific propensity to user data. Machine-learning methods as described throughout may, in a non-limiting example, generate coefficients used in fuzzy set equations as described above, such as without limitation x, c, and σ of a Gaussian set as described above, as outputs of machine-learning methods.

Still referring to FIG. 6, a processor may use a logic comparison program, such as, but not limited to, a fuzzy logic model to determine a compatibility score. A compatibility score may include, but is not limited to, high compatibility, mid compatibility, low compatibility, and the like; each such score may be represented as a value for a linguistic variable representing score, or in other words a fuzzy set as described above that corresponds to a degree of match of user designation as calculated using any statistical, machine-learning, or other method that may occur to a person skilled in the art upon reviewing the entirety of this disclosure. In other words, a given element of user profile and/or user related data may have a first non-zero value for membership in a first linguistic variable value such as a first user designation and a second non-zero value for membership in a second linguistic variable value such as a second user designation. In some embodiments, determining a user designation may include using a linear regression model. A linear regression model may include a machine learning model. A linear regression model may be configured to map data of user to one or more user designations. A linear regression model may be trained using training data as discussed above. In some embodiments, determining at least one user designation may include using a user designation classification model. A user designation classification model may be configured to input collected data and cluster data to a centroid based on, but not limited to, frequency of appearance, and the like. Centroids may include compatibility scores assigned to them such that each user profile and/or user related data may each be assigned a compatibility score. In some embodiments, an urgency classification model may include a K-means clustering model. In some embodiments, an urgency classification model may include a particle swarm optimization model. In some embodiments, determining a compatibility score of user profile and/or user related data may include using a fuzzy inference engine. A fuzzy inference engine may be configured to map one or more data elements using fuzzy logic. In some embodiments, a plurality of user designations may be arranged by a logic comparison program into compatibility score arrangements. A "compatibility score arrangement" as used in this disclosure is any grouping of objects and/or data based on degree of match for user specific propensity. This step may be implemented as described above. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. Continuing the example, an output linguistic variable may represent, without limitation, a community member designation. An inference engine may combine rules, such as: "if the audio interaction is 'high' and the user participation is 'high', the propensity for audio outputs is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T (a, b)=T (b, a)), monotonicity: (T (a, b)≤T (c, d) if a≤c and b≤d), (associativity: T (a, T (b, c))=T (T (a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 7:
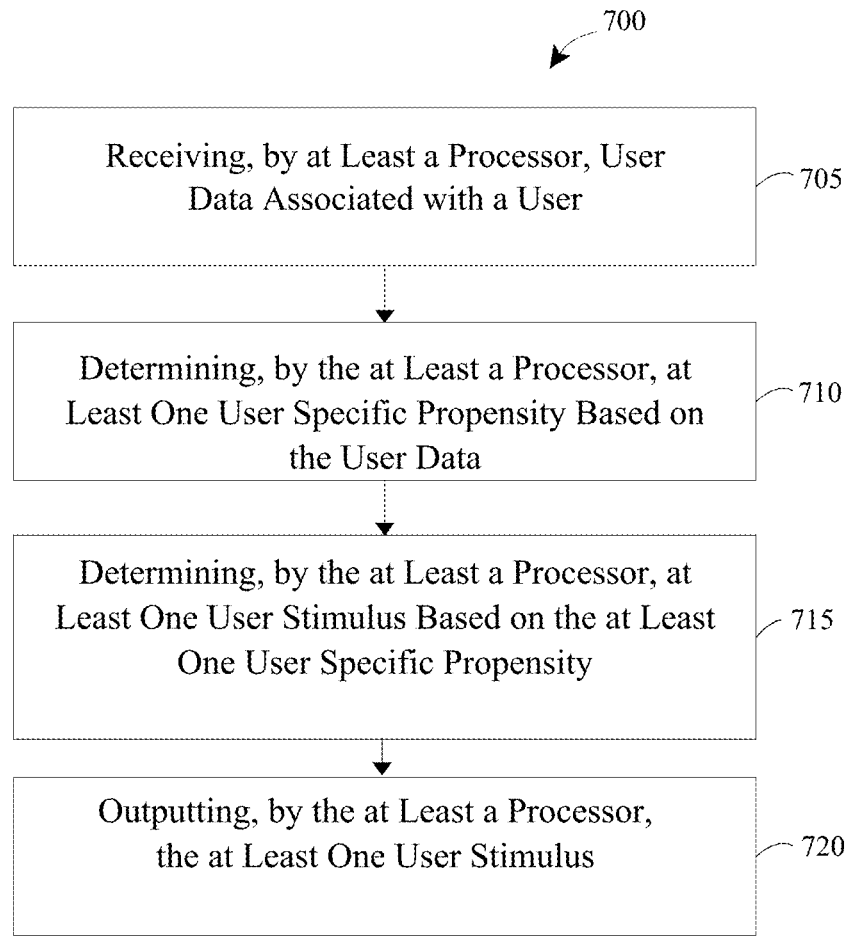
FIG. 7 is a flow diagram illustrating an exemplary embodiment of a method for generating tailored user specific encouragement prompts in accordance with one or more embodiments of the present disclosure.

Referring now to FIG. 7, a flow diagram of an exemplary method 700 for generating tailored user specific encouragement prompts is illustrated. At step 705, method 700 includes receiving, by at least a processor, user data associated with a user. In an embodiment, receiving user data associated with a user may comprise collecting, by the at least a processor, user interaction data for user interactions. Additionally, or alternatively, receiving user data associated with a user may include collecting, by the at least a processor user behavior data. These may be implemented as described and with reference to FIGS. 1-6.

With further reference to FIG. 7, at step 710, method 700 includes determining, by the at least a processor, at least one user specific propensity based on the user data. In an embodiment, determining at least one user specific propensity may include determining, by the at least a processor, a user cohort for the user based on a plurality of community users. Additionally, or alternatively, determining at least one user specific propensity based on the user data may include generating, by the at least a processor, a user propensity machine learning model, training, by the at least a processor, the user propensity machine learning model as a function of propensity training data, and identifying, by the at least a processor, the at least one user propensity using the trained propensity machine learning model. These may be implemented as described and with reference to FIGS. 1-6.

Still referring to FIG. 7, at step 715, method 700 includes determining, by the at least a processor, at least one user stimulus based on the at least one user specific propensity. Further, determining at least one user stimulus based on the at least one user specific propensity may include generating, by the at least a processor, a user stimulus machine learning model, training, by the at least a processor, the user stimulus machine learning model as a function of user stimulus training data, and identifying, by the at least a processor, the at least one user stimulus using the trained user stimulus machine learning model. In an embodiment, determining at least one user stimulus based on the at least one user specific propensity may include determining, by the at least a processor, a user stimulus mechanism for the at least one user stimulus. Additionally, or alternatively, determining a user stimulus mechanism for the at least one user stimulus may include determining, by the at least a processor, the user stimulus mechanism as a function of a user stimulus mechanism machine learning model. These may be implemented as described and with reference to FIGS. 1-6.

Continuing to reference FIG. 7, at step 720, method 700 includes outputting, by the at least a processor, the at least one user stimulus to the user. This may be implemented as described and with reference to FIGS. 1-6.

Still referring to FIG. 7, method 700 may include determining, by the at least a processor, a plurality of user specific propensities based on the plurality of user data and modifying, by the at least a processor, the at least one user stimulus based on the plurality of user specific propensities. Additionally, or alternatively, method 700 may include storing, by the at least a processor, the at least one user propensity on an immutable sequential listing. These may be implemented as described and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
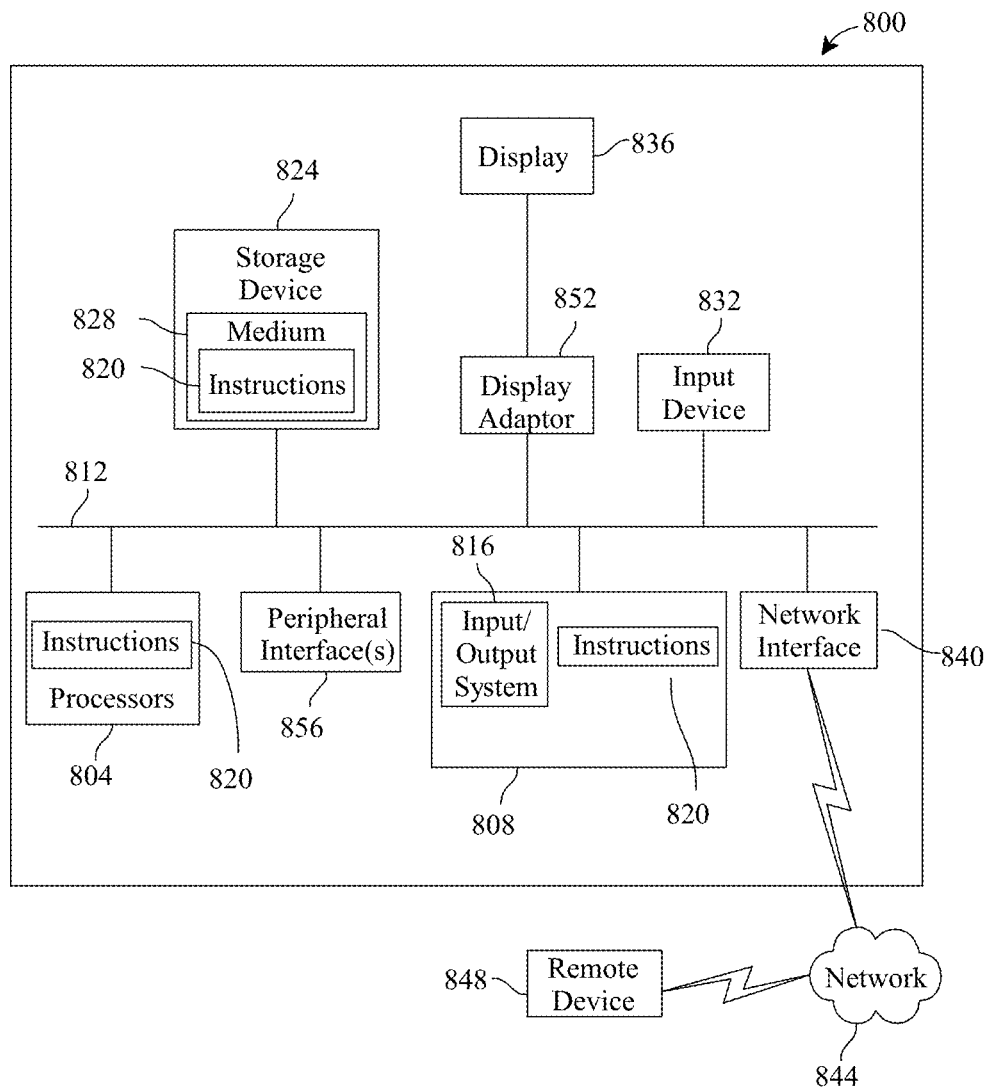
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating tailored user specific encouragement stimulus, the apparatus comprising:
    a decentralized platform comprising a decentralized network;
    at least a processor operating on the decentralized platform, and
    a memory communicatively coupled to the at least a processor, the memory comprising instructions configuring the at least a processor to:
        receive user data associated with a user from the decentralized platform;
        compiling user interaction data for the user, wherein compiling the user interaction data comprises tracking user reactions from outputs of the decentralized platform;
        determine at least one user specific propensity based on the user data;
        generate at least one user stimulus based on the at least one user specific propensity; and
        output the at least one user stimulus.

2. The apparatus of claim 1, wherein receiving user data associated with the user comprises collecting user interaction data for user interactions.

3. The apparatus of claim 1, wherein receiving user data associated with the user comprises collecting user behavior data.

4. The apparatus of claim 1, wherein determining the at least one user specific propensity comprises determining a user cohort for the user from a plurality of community users.

5. The apparatus of claim 1, wherein the memory further comprises instructions configuring the at least a processor to:
    determine a plurality of user specific propensities based on the user data; and
    modify the at least one user stimulus based on the plurality of user specific propensities.

6. The apparatus of claim 1, wherein the determining the at least one user specific propensity based on the user data comprises:
    generating a user propensity machine learning model;
    training the user propensity machine learning model as a function of propensity training data; and
    identifying the at least one user propensity using the trained user propensity machine learning model.

7. The apparatus of claim 1, wherein determining the at least one user stimulus based on the at least one user specific propensity comprises determining a user stimulus mechanism for the at least one user stimulus.

8. The apparatus of claim 7, wherein determining the user stimulus mechanism for the at least one user stimulus comprises determining the user stimulus mechanism as a function of a user stimulus mechanism machine learning model.

9. The apparatus of claim 1, wherein determining the at least one user stimulus based on the at least one user specific propensity comprises:
    generating a user stimulus machine learning model;
    training the user stimulus machine learning model as a function of user stimulus training data; and
    identifying the at least one user stimulus using the trained user stimulus machine learning model.

10. The apparatus of claim 1, wherein the memory further comprises instructions configuring the at least a processor to store at least one user specific propensity on an immutable sequential listing.

11. A method for generating tailored user specific encouragement stimulus, the method comprising:
    receiving, by the at least a processor, user data associated with a user from a decentralized platform;
    compiling, by the at least a processor, user interaction data for the user, wherein compiling the user interaction data comprises tracking user reactions from outputs of the decentralized platform;
    determining, by the at least a processor, at least one user specific propensity based on the user data;
    determining, by the at least a processor, at least one user stimulus based on the at least one user specific propensity; and
    outputting, by the at least a processor, the at least one user stimulus.

12. The method of claim 11, wherein receiving user data associated with the user comprises collecting, by the at least a processor, user interaction data for user interactions.

13. The method of claim 11, wherein receiving user data associated with the user comprises collecting, by the at least a processor user behavior data.

14. The method of claim 13, wherein determining the at least one user specific propensity comprises determining, by the at least a processor, a user cohort for the user from a plurality of community users.

15. The method of claim 11, wherein the method further comprises:
    determining, by the at least a processor, a plurality of user specific propensities based on the user data; and
    modifying, by the at least a processor, the at least one user stimulus based on the plurality of user specific propensities.

16. The method of claim 11, wherein determining the at least one user specific propensity based on the user data comprises:
    generating, by the at least a processor, a user propensity machine learning model;
    training, by the at least a processor, the user propensity machine learning model as a function of propensity training data; and
    identifying, by the at least a processor, the at least one user propensity using the trained user propensity machine learning model.

17. The method of claim 11, wherein determining the at least one user stimulus based on the at least one user specific propensity comprises determining, by the at least a processor, a user stimulus mechanism for the at least one user stimulus.

18. The method of claim 17, wherein determining the user stimulus mechanism for the at least one user stimulus comprises determining, by the at least a processor, the user stimulus mechanism as a function of a user stimulus mechanism machine learning model.

19. The method of claim 11, wherein determining the at least one user stimulus based on the at least one user specific propensity comprises:
    generating, by the at least a processor, a user stimulus machine learning model;

training, by the at least a processor, the user stimulus machine learning model as a function of user stimulus training data; and identifying, by the at least a processor, the at least one user stimulus using the trained user stimulus machine learning model.

20. The method of claim 11, wherein the method further comprises storing, by the at least a processor, the at least one user specific propensity on an immutable sequential listing.

* * * * *